United States Patent
Williams

(10) Patent No.: US 7,546,642 B2
(45) Date of Patent: Jun. 9, 2009

(54) LATCHING PROCESSOR STATE INFORMATION

(75) Inventor: Michael John Williams, Cambridge (GB)

(73) Assignee: ARM Limited, Cambridge (GB)

( * ) Notice: Subject to any disclaimer, the term of this patent is extended or adjusted under 35 U.S.C. 154(b) by 78 days.

(21) Appl. No.: 10/887,307

(22) Filed: Jul. 9, 2004

(65) Prior Publication Data

US 2006/0010307 A1 Jan. 12, 2006

(51) Int. Cl.
*G06F 21/24* (2006.01)
(52) U.S. Cl. .......................... 726/30; 712/227
(58) Field of Classification Search ................ 712/43, 712/229, 227; 726/30
See application file for complete search history.

(56) References Cited

U.S. PATENT DOCUMENTS

| 5,621,886 A * | 4/1997 | Alpert et al. .................. 714/38 |
| 6,173,386 B1 * | 1/2001 | Key et al. ..................... 712/10 |
| 6,598,150 B2 | 7/2003 | Williams et al. |
| 2002/0049893 A1 * | 4/2002 | Williams et al. ............. 712/11 |
| 2003/0140245 A1 * | 7/2003 | Dahan et al. ................. 713/200 |
| 2004/0260910 A1 * | 12/2004 | Watt et al. ..................... 712/43 |

* cited by examiner

*Primary Examiner*—Eddie P Chan
*Assistant Examiner*—Robert E Fennema
(74) *Attorney, Agent, or Firm*—Nixon & Vanderhye P.C.

(57) ABSTRACT

A data processing apparatus and method is disclosed. The data processing apparatus comprises a processor unit operable to execute data processing instructions, a processor state register within the processor unit operable to store processor state information associated with a data processing instruction being executed by the processor unit and a processor state storage circuit operable to store the processor state information provided by the processor state register for transmission to a diagnostic system. The processor state storage circuit is operable, in response to a processor state request signal from the diagnostic system requesting the stored processor state information, to prevent transmission of the stored processor state information to the diagnostic system when the processor unit is in a predetermined operating state. Hence, when the processor unit is in an operating state which may generate irrelevant or misleading processor state information, this processor state information is prevented from being provided to the diagnostic system. It will be appreciated that preventing such information from being sent to the diagnostic system ensures that only relevant information is analysed by the diagnostic system, and that any statistical data generated by the diagnostic system is accurate.

42 Claims, 4 Drawing Sheets

| Process Identifier Selector Field (4 bits) | Instruction Set Mask (4 bits) | Privileged /User (2 bits) | Secure/ Non-secure (2 bits) |
|---|---|---|---|
| 11:8 | 7:4 | 3:2 | 1:0 |

0000 = Ignore
0001 = PID compare 1
xxxx = RESERVED

0000 = Ignore
xxx1 = ARM
x1xx = Thumb
x1xx = Java
1xxx = RESERVED

00 = Ignore
01 = Priv
10 = User
11 = RESERVED

00 = Ignore
01 = Secure
10 = Non-Secure
11 = RESERVED

Fig. 4

LATCHING PROCESSOR STATE INFORMATION

BACKGROUND OF THE INVENTION

1. Field of the Invention

The present invention relates to a data processing apparatus and method. More particularly, the present invention relates to a data processing apparatus operable to latch processor state information associated with a data processing instruction being executed by a processing unit, and a mechanism for providing that processor state information for diagnostic purposes.

2. Description of the Prior Art

When performing diagnostic operations, such as debugging, on a data processing apparatus executing data processing instructions, it is often useful to know which instructions within software code being tested are being executed. Many techniques exist to enable such diagnostic operations.

One known technique is to provide data capturing hardware on the relevant buses within the data processing apparatus and to generate a trace output of every single instruction that is executed as a stream of real-time data. The problem with this approach is that high speed and expensive memories are needed to store the very large quantities of data generated. Typically, with this arrangement only small time periods can be fully monitored due to the limited storage capacity of such memories.

Another technique is known as profiling in which a program counter value is periodically sampled to provide statistical information on the program counter value during the execution of the data processing instructions.

In one profiling technique an interrupt signal is provided to the processor unit, which causes interrupt code to be executed which outputs the value of a program counter register at the point that the interrupt occurred. A problem with this approach is that interrupting the processor unit can disturb the true real-time behaviour of the processor unit, and in some circumstances can produce unrepresentative results.

Another profiling technique is disclosed in U.S. Pat. No. 6,598,150, filed by a common assignee, the contents of which are incorporated by reference. This technique enables program counter values to be provided from a processor core to diagnostic hardware and latched therein. The diagnostic hardware is responsive to a program counter request signal from an external diagnostic system. The diagnostic hardware transfers a program counter value into a scan chain from where it can be provided to the diagnostic system. It will be appreciated that this technique enables the operation of the diagnostic system to be de-coupled from that of the processor core, thereby enabling real time operation of the processor core. Hence, the external diagnostic system can asynchronously sample the program counter value of a processing system under test.

It is desired to provide an improved diagnostic technique.

SUMMARY OF THE INVENTION

According to a first aspect of the present invention there is provided a data processing apparatus comprising: a processor unit operable to execute data processing instructions; a processor state register within the processor unit operable to store processor state information associated with a data processing instruction being executed by the processor unit; and a processor state storage circuit operable to store the processor state information provided by the processor state register for transmission to a diagnostic system, the processor state storage circuit being further operable, in response to a processor state request signal from the diagnostic system requesting the stored processor state information, to prevent transmission of the stored processor state information to the diagnostic system when the processor unit is in a predetermined operating state.

The present invention recognises that processor state information provided to a diagnostic system may contain information which is irrelevant to the diagnostic system or which can even mislead the diagnostic system. Accordingly, the processor state storage circuit is operable, when the processor unit is in an operating state which may generate such irrelevant or misleading processor state information, to prevent that information from being provided to the diagnostic system. It will be appreciated that preventing such information from being sent to the diagnostic system ensures that only relevant information is analysed by the diagnostic system, and that any statistical data generated by the diagnostic system is accurate. Also, it will be appreciated that preventing the supply of information in these situations reduces the quantity of information to be analysed by the diagnostic system. Accordingly, the amount of information required to be stored by the diagnostic system may be reduced which, in turn, reduces the amount of information to be analysed. It will be appreciated that this can lead to significant improvements in the performance of the diagnostic system.

In one embodiment, the processor state information comprises an instruction address of the data processing instruction being executed by the processor unit and the processor state storage circuit is operable to store an instruction address provided by the processor state register and, when the processor unit is in the predetermined operating state, to prevent transmission of the stored instruction address to the diagnostic system.

It will be appreciated that one of the most common forms of processor state information provided to a diagnostic system is the instruction address of an instruction being executed, which can be provided by the value contained in a program counter. As mentioned above, the program counter value is particularly useful when profiling software code under test. Accordingly, when the processor state information comprises an instruction address the processor state storage circuit stores that instruction address provided by a register within the processing unit, and when the processing unit is in a particular operating state the stored instruction address is prevented from being transmitted to the diagnostic system. Hence, only those program counter values of interest will be propagated to the diagnostic system for analysis.

In one embodiment, when the processor unit is in the predetermined operating state, the processor state storage circuit is operable to transmit a predetermined instruction address to the diagnostic system instead of the stored instruction address, the predetermined instruction address being indicative to the diagnostic system that transmission of the stored instruction address has been prevented.

When the transmission of the stored instruction address is prevented the processor state storage circuit transmits a predetermined instruction address to the diagnostic system in place of the stored instruction address. The present invention recognises that the operating speed of the processor unit and the processor state storage circuit will be typically much faster than the transmission speed to the diagnostic system. Accordingly, the mechanism by which the state request signal is propagated and the processor state information returned is optimised to enable high speed data exchange to occur. Hence, it will be appreciated that performing any analysis of the processor state information when being returned would significantly impact on the performance of the data exchange. Accordingly, instead of performing that analysis during the data exchange in order to identify instruction addresses which should be disregarded, the data exchange is allowed to be performed without interruption, which maintains efficiency, and a predetermined instruction address is provided which can be identified by the diagnostic system.

Also, transmitting a predetermined instruction address provides compatibility with existing diagnostic systems which expect to receive an instruction address in response to a request for that instruction address, and whose data exchange mechanism is optimised to support such data exchanges. However, by providing a predetermined instruction address which can be recognised by the diagnostic system as relating to instruction addresses whose transmission has been prevented because they relate to operating states of the processor unit which are of no interest to the diagnosis, these instruction addresses can readily be discounted during that subsequent analysis. It will also be appreciated that by providing a predetermined instruction address enables the diagnostic system to identify those instruction addresses which should be discounted significantly more efficiently.

In one embodiment, the predetermined instruction address is a reserved or invalid address.

It will be appreciated that using a reserved or an invalid address simplifies the identification of the predetermined instruction address to the diagnostic system and can efficiently flag to the diagnostic system that the instruction address should be ignored.

In one embodiment, the diagnostic system is operable to analyse instruction addresses associated with data processing instructions of software under test.

It will be appreciated that the software under test may be all or a proportion of the data processing instructions being executed by the processor unit. Typically, the software under test will comprise a portion or portions of application code being executed on the processor unit.

In one embodiment, the predetermined operating state comprises a state where execution of the data processing instructions of the software under test is suspended.

The present invention recognises that when the normal operation of the software under test is suspended, halted or interrupted for a particular reason, the value of the instruction address being returned can remain constant. Accordingly, the instances of that particular instruction address value will be greater than would normally occur under normal operating conditions. Hence, the instruction address value is prevented from being transmitted to the diagnostic system in order to prevent an invalid statistical analysis being made by the diagnostic system.

In one embodiment, the predetermined operating state comprises a debug state.

In the debug state the operation of the data processing unit is suspended to enable the status of the data processing apparatus to be examined. Hence, in this particular state, the value of the instruction address will be unrepresentative of the normal operation of the software under test.

In one embodiment, the predetermined operating state comprises a state where the processor unit is executing a data processing instruction other than data processing instructions of the software under test.

Hence, only the instruction addresses of the software under test are transmitted to the diagnostic system and instruction addresses of data processing instructions other than the software under test are prevented from being transmitted to the diagnostic system. It will be appreciated that by filtering out the instruction addresses of instructions which do not form part of the software under test significantly reduces the amount of instruction addresses to be analysed, which, in turn, simplifies the diagnosis process.

In one embodiment, the processor unit is operable to execute data processing instructions relating to different processes, the software under test comprises one predetermined process of the different processes and the predetermined operating state comprises a state where the processor unit is executing a data processing instruction other than a data processing instruction of the predetermined process.

The present invention recognises that when a processing unit is executing data processing instructions for different processes, the processing unit will often utilise a virtual address scheme whereby different data processing instructions are switched in and out the address space of the data processing apparatus. This switching results in different software processes sharing the same program counter values. Therefore, instruction addresses of data processing instructions other than a data processing instruction of the predetermined process are prevented from being transmitted to the diagnostic system.

In one embodiment, the predetermined operating state comprises a state where the processor unit is executing data processing instructions from a predetermined instruction set.

Hence, only those instruction addresses associated with the predetermined instruction set are transmitted to the diagnostic system. This is particularly useful in environments which support multiple instruction sets and when attempting to analyse the operation of software code provided in one or more of those instructions sets.

In one embodiment, the predetermined instruction set comprises one or more of an ARM, Thumb and Java instruction set.

Accordingly, it is possible to filter out instruction addresses associated with particular instruction sets or to only allow instruction addresses associated with particular instruction sets to be transmitted.

In one embodiment, the predetermined operating state comprises a state where the processor unit is executing data processing instructions in a predetermined mode.

Hence, only those instruction addresses associated with the predetermined mode are transmitted to the diagnostic system. This is particularly useful in environments which support multiple modes and when attempting to analyse the operation of software code operating in one or more of those modes.

In one embodiment, the predetermined mode comprises a state where the processor unit is executing a data processing instruction for which transmission of its instruction address is not permitted by the data processing apparatus.

Hence, when the data processing apparatus is operating in a state which does not permit the transmission of instruction addresses the processing state storage circuit prevents transmission of those instruction addresses to the diagnostic system.

In one embodiment, the predetermined mode comprises a state where the processor unit is executing a data processing instruction for which receipt of its instruction address is not required by the diagnostic system.

Hence, when the data processing apparatus is executing an instruction which the diagnostic system does not require the receipt, the processing state storage circuit prevents transmission of those instruction addresses to the diagnostic system.

In one embodiment, the predetermined mode comprises a secure state.

It will be appreciated that when operating in a secure state there is a desire to restrict the amount of information that is provided to any diagnostic system. This is because it is desirable to seek to protect the operation of the processor unit when operating in the secure state to prevent analysis of any secure software code or to prevent confidential information being processed by that software code from being accessed or compromised.

The present invention recognises that knowledge of the instruction addresses of data processing instructions being executed on a processing unit when operating in the secure state can provide an insight into the operation of the software code which can lead to compromise of confidential information. For example, it may be possible to analyse the instruction addresses and determine the operation of any encryption or decryption software which may be running in the secure state. Hence, when operating in the secure state such instruction addresses are prevented from being transmitted to the diagnostic system.

In one embodiment, the processor unit is operable in a secure state to execute data processing instructions relating to different processes and the predetermined mode comprises a secure process mode in which the processor unit is executing a data processing instruction other than a data processing instruction of one or more predetermined processes executing in the secure mode.

It is often the case that different software applications are executed as different respective processes. Hence, when in the secure state, processes relating to different software applications may be being executed by the processing unit. The different software applications may be provided by different vendors who are keen to prevent analysis of their respective software code. However, it will be appreciated that it is often desirable to analyse software code being executed in the secure state, when such analysis is permitted by trusted parties. Hence, when multiple processes are running in the secure state, the transmission of instruction addresses can be prevented for selected ones of those processes, whilst the transmission of instruction addresses allowed for those processes for which analysis is permitted.

In one embodiment, the different processes execute in either a privileged or a non-privileged mode and the secure process mode comprises a secure non-privileged process mode in which the processor unit is executing a data processing instruction other than a data processing instruction of a predetermined process executing in the non-privileged mode.

In some environments, in addition to the secure and non-secure states, privileged and non-privileged modes are provided. Typically, it will be undesirable to provide information relating to software being executed in the secure privileged mode. Hence, instruction addresses of software being executed in the secure privileged mode are prevented from being propagated to the diagnostic system.

In one embodiment, the predetermined mode comprises a privileged mode.

In some environments, privileged and non-privileged modes are provided. Typically, software code such as an operating system will execute in the privileged mode, whilst application software will execute in the non-privileged mode. It will be often be undesirable or unnecessary to provide information relating to software being executed in the privileged mode. Hence, instruction addresses of software being executed in the privileged mode are prevented from being propagated to the diagnostic system.

In one embodiment, the processor unit is operable in a privileged mode or a non-privileged mode to execute data processing instructions relating to different processes and the predetermined mode comprises a non-privileged process mode in which the processor unit is executing a data processing instruction other than a data processing instruction of a predetermined process executing in the non-privileged mode.

It is often the case that different software applications are executed as different respective processes. Typically, software code such as an operating system will execute in the privileged mode, whilst application software will execute in the non-privileged mode. It will be often be undesirable or unnecessary to provide information relating to software being executed in the privileged mode. However, it will be appreciated that it is sometimes desirable to analyse software code being executed in the non-privileged mode. Hence, when multiple processes are running in the non-privileged mode, the transmission of instruction addresses can be prevented for all except a number of those processes, whilst the transmission of instruction addresses is allowed the selected processes.

In one embodiment, the diagnostic system is operable to control the processor state storage circuit in order to set one or more predetermined operating states which prevent transmission of the stored processor state information to the diagnostic system.

Accordingly, the diagnostic system can control the operation of the processor state storage circuit and set the conditions under which processor state is provided and/or the conditions under which the transmission of processor state is prevented. It will be appreciated that the diagnostic system will set the conditions in dependence on the particular analysis to be performed.

In one embodiment, the processor state storage circuit further comprises a number of registers operable to store information provided by the diagnostic system indicative of the one or more predetermined operating states which prevent transmission of the stored processor state information to the diagnostic system.

In one embodiment, the processor state storage circuit is operable to determine whether the processor unit is in the one or more predetermined operating states by comparing information provided by the processor unit indicative of its operating state with the information stored in the number of registers.

According to a second aspect of the present invention there is provided in a data processing apparatus comprising: a processor unit operable to execute data processing instructions; a processor state register within said processor unit operable to store processor state information associated with a data processing instruction being executed by said processor unit; and a processor state storage circuit operable to store said processor state information provided by said processor state register for transmission to a diagnostic system, a method of processing data comprising the steps of: providing, from said diagnostic system, a processor state request signal requesting said stored processor state information; and preventing transmission of said stored processor state information to said diagnostic system when said processor unit is in a predetermined operating state.

BRIEF DESCRIPTION OF THE DRAWINGS

The present invention will be described further, by way of example only with reference to the preferred embodiments thereof as illustrated in the accompanying drawings, in which:

FIG. 4 illustrates the arrangement of the control register of FIG. 2.

DESCRIPTION OF THE PREFERRED EMBODIMENTS

Figure 1:
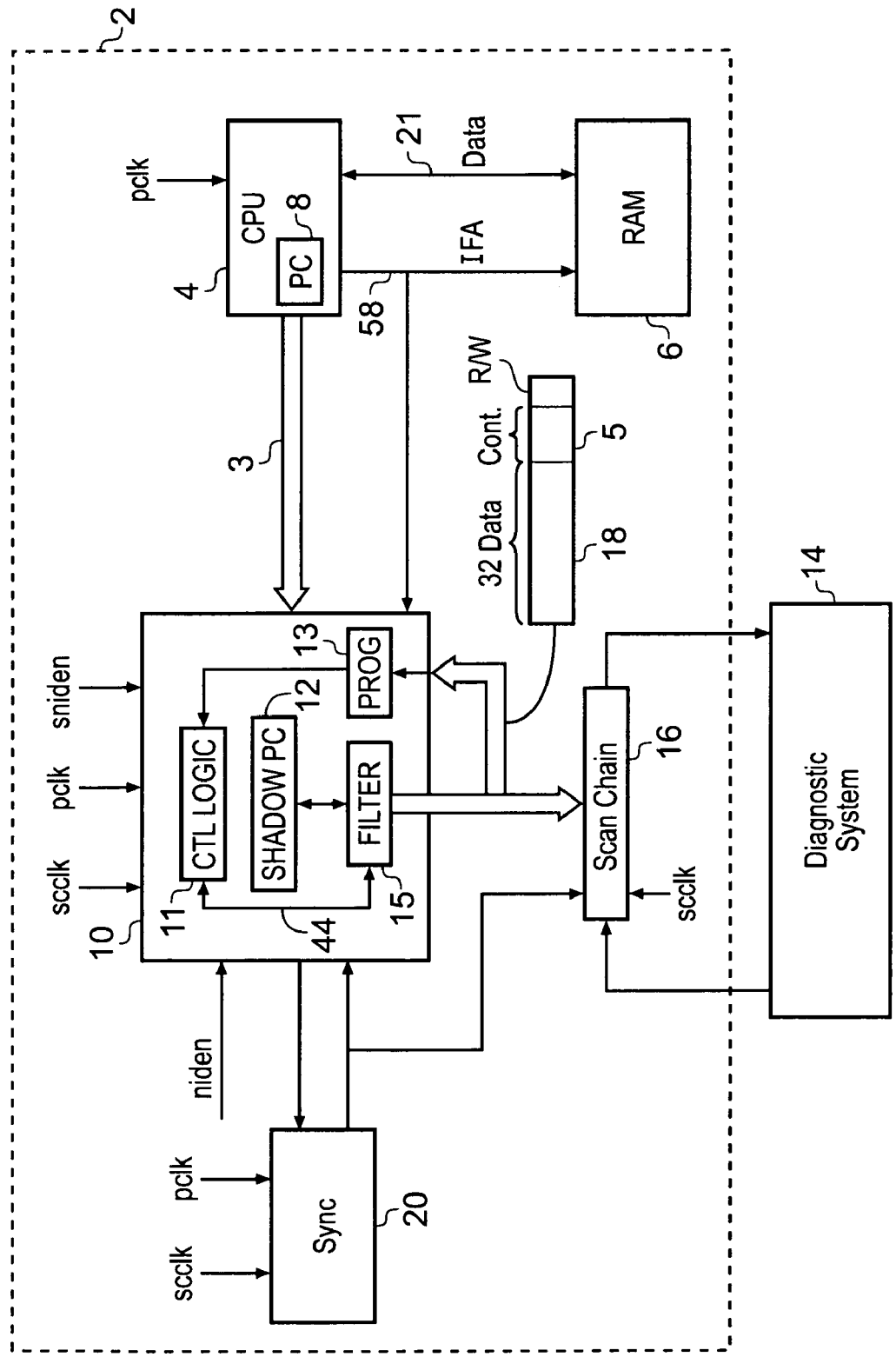
FIG. 1 is a block diagram showing the arrangement of a data processing apparatus according to an embodiment of the present invention to which a diagnostic system is coupled.

FIG. 1 shows a data processing apparatus 2 coupled with a diagnostic system 14. The data processing apparatus 2 includes a processor unit 4, memory 6, diagnostic hardware 10, synchronisation logic 20 and scan chain logic 16.

The processor unit 4 and the memory 6 are coupled by address bus 58 and a data bus 21. The processor unit 4 executes data processing instructions received from the memory 6. A program counter register 8 within the processor unit 4 contains a value indicative of the address within the memory 6 of the data processing instruction being executed. The processor unit 4 receives a processor clock signal pclk and operates in real time at its full normal operating speed.

Diagnostic hardware 10 is provided within the data processing apparatus 2. This diagnostic hardware 10 is an in-circuit emulation unit such as the embedded in-circuit emulation (EmbeddedICE) unit provided by ARM Limited, Cambridge, England. The diagnostic hardware 10 receives signals over various buses and paths 3 from the processor unit 4 (as will be described in more detail with reference to FIG. 2) indicative of the operating state of the processor unit 4. In addition, the diagnostic hardware 10 receives the processor clock signal pclk and a scan chain clock signal scclk. Furthermore, the diagnostic hardware 10 receives signals from other components of the data processing apparatus 2 indicative of the operating state of the data processing apparatus 2, such as a non-invasive debug enable signal NIDEN (which is asserted to indicate non-invasive debug is permitted by the data processing apparatus 2) and a secure non-invasive debug enable signal SNIDEN (which is asserted to indicate secure non-invasive debug is permitted by the data processing apparatus 2).

The diagnostic hardware 10 also receives processor state information from the processor unit 4, such as a program counter value received over the address bus 58 and, from values received from the processor unit 4, the diagnostic hardware 10 calculates the program counter register value and places that information in a shadow program counter register 12. In particular, the shadow program counter register 12 is responsive to the signals provided over the paths 3 and the address bus 58 to maintain a shadow program counter value which is the same as the program counter value stored within the program counter register 8 within the processor unit 4. The program counter value within the shadow program counter register 12 is updated, when appropriate, as the corresponding program counter value within the program counter register 8 changes in synchronism with the processor clock pclk.

The filter control logic 11 and filter logic 15 operate to prevent the program counter value stored in the shadow program counter register 12 from being propagated to the diagnostic system 14 under predetermined conditions. A programming interface 13 is provided which operates to program the predetermined conditions under which the program counter value stored in the shadow program counter register 12 should be prevented from being propagated to the diagnostic system 14.

The programming interface 13 receives program information indicative of any conditions under which the program counter value stored in the shadow program counter register 12 is to be prevented from being transmitted to the diagnostic system 14. The program information received by the programming interface 13 sets a number of registers within the filter control logic 11 which are used when determining whether a particular condition is met. When the filter control logic 11 determines that one or more predetermined conditions are met then a filter signal is asserted over the path 44 to the filter logic 15. When the filter logic 15 receives the filter signal over the path 44 it prevents the program counter value stored in the shadow program counter register 12 from being transmitted via the scan chain 16 to the diagnostic system 14. Instead, the filter logic 15 provides a predetermined program counter value which indicates to the diagnostic system 14 that the transmission of the program counter value stored in the shadow program counter register 12 has been prevented. More details on the operation of the filter control logic 11, filter logic 15 and programming interface 13 will be provided with reference to FIG. 2 below.

The diagnostic system 14 is coupled to the diagnostic hardware 10 via a JTAG scan chain system which operates to serially transfer data into and from a scan chain 16 associated with the diagnostic hardware 10. Diagnostic instructions 18 can be scanned into the scan chain 16 by the diagnostic system 14. Diagnostic instructions are used to control the operation of the diagnostic hardware 10. The diagnostic instructions 18 are in the form of a 38-bit word comprising a 32-bit data field, a 1-bit read or write field and a 5-bit control field. The diagnostic instructions will typically trigger a predetermined operation within the diagnostic hardware 10. Each instruction will be serially clocked into the scan chain 16 under the control of the scan chain clock signal scclk. From the scan chain 16, the instruction is read by the programming interface 13 of the diagnostic hardware 10. However, it will be appreciated that techniques other than the use of the scan chain 16 could be used to transfer data into and from the diagnostic hardware 10.

Diagnostic instructions in the form of program instructions are interpreted by the programming interface 13 as indicating that registers within the filter control logic 11 should be set to indicate the conditions under which transmission of the data value stored within the shadow program counter register 12 should be prevented, as will be described in more detail below with reference to FIG. 2.

Diagnostic instructions in the form of request instructions are interpreted by the programming interface 13 as indicating that the program counter value stored within the shadow program counter register 12 should be transferred into the scan chain 16 to enable the value to be read out by the diagnostic system 14.

To ensure synchronisation between the shadow program counter register 12 and the diagnostic system 14, a synchronisation unit 20 is provided. The synchronisation unit 20 receives a signal "next" from the diagnostic hardware 10 indicating that the transfer from the shadow program counter register 12 to the scan chain 16 via the filter logic 15 should take place at the next available point within the processor clock signal pclk. Once that predetermined point is reached within the processor clock signal pclk, the synchronisation unit 20 issues a transfer signal "trans" to the diagnostic hardware 10 and the scan chain 16, which initiates the writing into the scan chain 16 of the value provided by the filter logic 15. Once the transfer has taken place, the program counter value can be serially clocked out from the scan chain 16 to the diagnostic system 14 using standard JTAG techniques.

Figure 2:
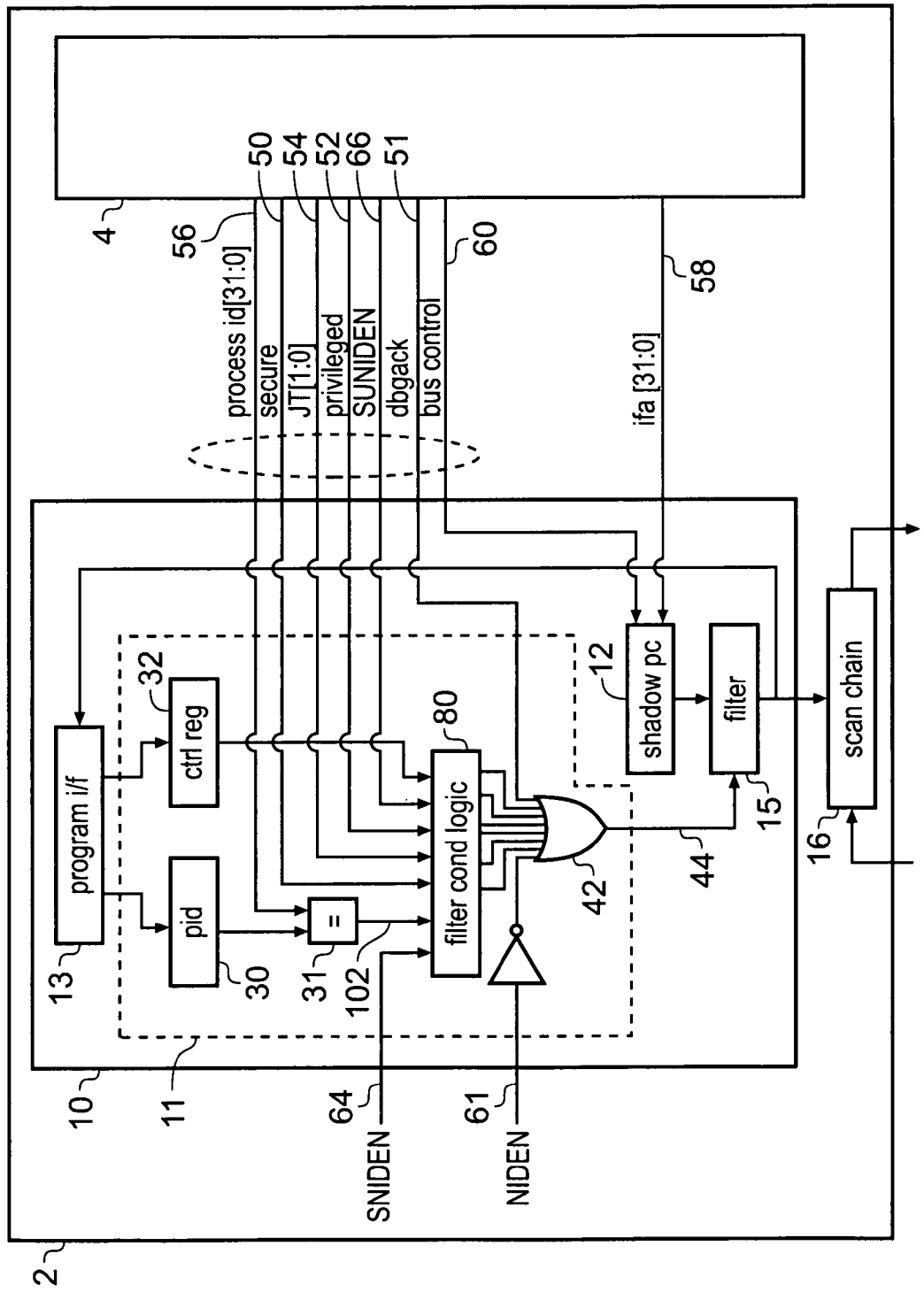
FIG. 2 shows in more detail the arrangement of components of the data processing apparatus of FIG. 1.

FIG. 2 illustrates in more detail the arrangement of the diagnostic hardware 10. As mentioned previously, the programming interface 13 is operable to receive program instructions which may program the contents of the control register 32 (which is illustrated in more detail in FIG. 4) and a process ID register 30 to indicate some of the conditions under which the propagation of the value stored in the shadow program counter register 12 is to be prevented.

Figure 3:
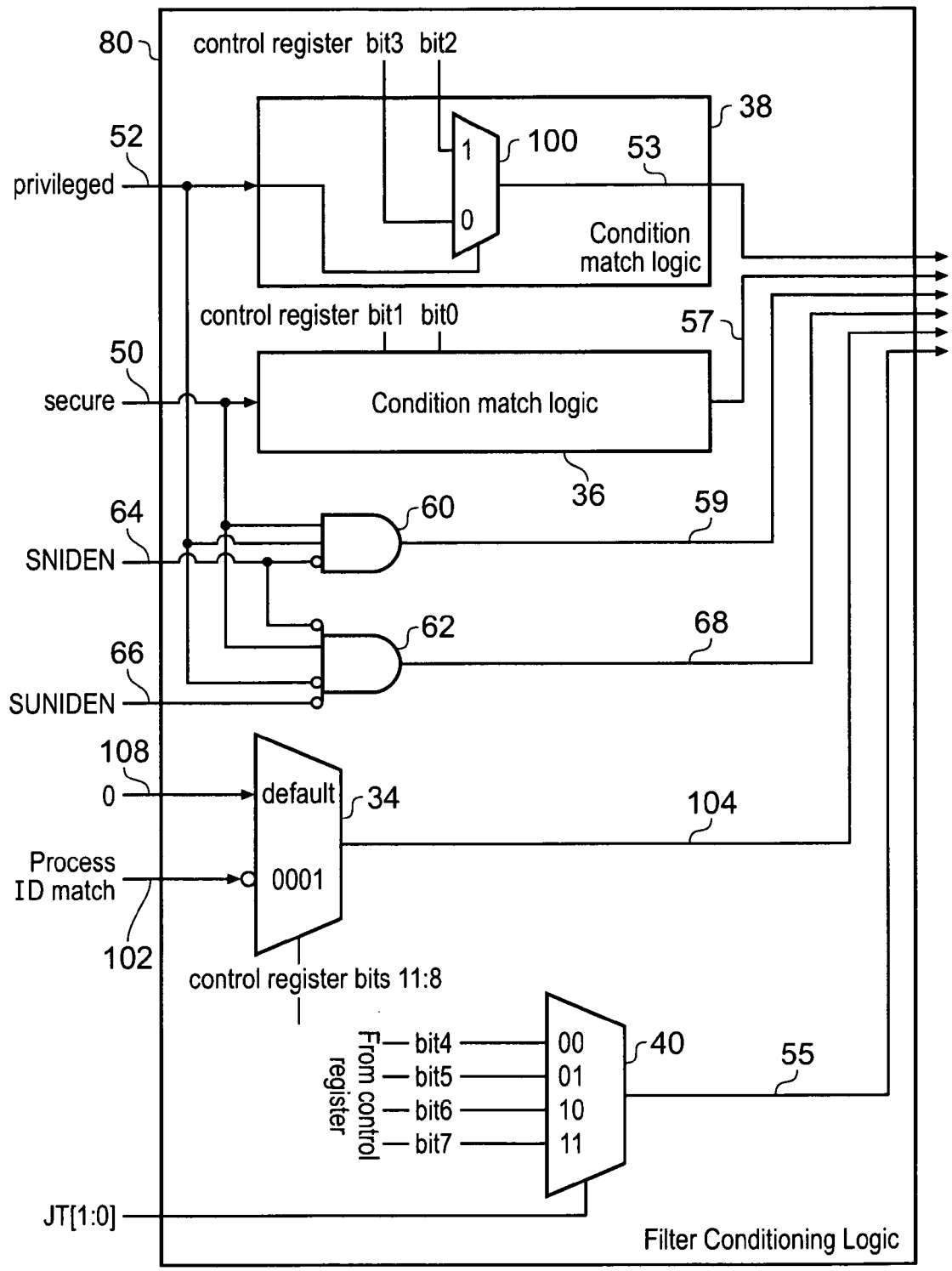
FIG. 3 illustrates the arrangement of filter control logic of FIG. 2.

The contents of the control register 32, in addition to a number of signals from the processor unit 4, are provided to the filter conditioning logic 80 (which is illustrated in more detail in FIG. 3). Also provided to the filter conditioning logic 80 is a signal from process ID comparator logic 31 which indicates whether instructions associated with a process ID stored in the process ID register 30 are currently being processed by the processor unit 4.

Should the filter condition logic 80 determine that any of the conditions are met then a signal is received by the OR gate 42, which, in turn, causes a signal to be asserted over the path 44 to the filter logic 15 to cause the propagation of the value stored in the shadow program counter register 12 to be prevented. The OR gate 42 also receives a signal dbgack from the processor unit 4 over the path 51 and an inverted form of the signal NIDEN from the data processing apparatus 2 over the path 61, a more detailed description of these signals is given below. Should either of these two signals be asserted then the OR gate 42 causes a signal to be asserted over the path 44 to the filter logic 15 to cause the propagation of the value stored in the shadow program counter register 12 to be prevented. In this embodiment, the filter logic 15 causes a predetermined program counter value to be propagated which indicates to the diagnostic system 14 that the propagation of the actual value has been prevented.

The 32-bit address bus 58 indicates the address of a data value that will be processed by the processor unit 4 and the signals provided over the path 60 indicate whether or not the address on the address bus 58 is associated with an instruction or data. The shadow program counter register 12 is arranged to only store address values associated with instructions.

As discussed above, the program interface 13 is responsive to program instructions which program the control register 32 and the process ID register 30 to indicate those conditions under which the filter logic 15 should prevent the transmission of the contents of the shadow program counter register 12.

FIG. 4 illustrates the arrangement of the control register 32 in more detail.

Bits 1 and 0 of the control register 32 are used to indicate when the transmission is to be prevented based on secure state information. Hence, if bits 1 and 0 of the control register 32 are set to "00" then transmission will be not be prevented irrespective of the security state of the processor unit 4. If these bits are set to "01" then transmission will be prevented when the processor unit 4 is in the secure state. If these bits are set to "10" then transmission will be prevented when the processor unit 4 is in a non-secure state.

Bits 3 and 2 of the control register 32 are used to indicate whether transmission is to be prevented based on privileged or non-privileged (also referred to as user) mode information. Hence, if bits 3 and 2 of the control register 32 are set to "00" then transmission will not be prevented irrespective of the mode of the processor unit 4. If these bits are set to "01" then transmission is prevented when the processor unit 4 is in privileged mode, whereas if these bits are set to "10" then transmission is prevented when the processor unit 4 is in user mode.

Bits 7 to 4 of the control register 32 are used to indicate whether transmission is to be prevented when a particular instruction set is being used. As indicated in FIG. 4, if bit 4 is set to '1' then transmission is prevented when the processor unit 4 is executing instructions from the ARM instruction set, if bit 5 is set to '1' then transmission is prevented when the processor unit 4 is executing instructions from the Thumb instruction set, and if bit 6 is set to '1' then transmission is prevented when the processor unit 4 is executing instructions from the Java instruction set.

Bits 11 to 8 of the control register 32 are used to select one of a number of a process ID comparison result signals. Should the selected process ID comparison result signal be asserted then transmission is allowed, otherwise transmission is prevented. In the embodiment illustrated there is only one process ID register 30, having an associated comparator 31 which provides a process ID comparison result signal. The process ID comparison result signal is asserted when the process ID stored in the process ID register 30 matches the process ID signal provided by the processor unit 4 over the path 56. The process ID signal provided by the processor unit 4 over the path 56 is programmed by the operating system software executed on the processor unit 4 to be a unique value which identifies which of the a plurality of processes which may be executed on the processor unit 4 is currently being executed.

In this embodiment, there is only one process ID comparison result signal which can be selected. However, it will be appreciated that more than one process ID register may be provided, together with associated comparators and each of the process ID registers may be programmed by the diagnostic system 14. Hence, more than one process ID comparison result signal may be provided. As this embodiment shows only one process ID comparison result signal, only one setting for bits 11 to 8 is illustrated. If the bits 11 to 8 are set to the value "0001" then, if the process ID comparison result signal is not set, then transmission of the value stored in the shadow PC register 12 is prevented. In the illustrated arrangement, if bits 11 to 8 are set to any other value, then this process ID comparison result signal is ignored. It will be appreciated that these process comparison result signals may have a variety of other uses within the diagnostic hardware 10, such as in the conditioning of breakpoints. Hence, the cost of providing such comparators may already be borne by the provision of these other features within the diagnostic hardware.

FIG. 3 illustrates the arrangement of the filter conditioning logic 80. As discussed above, the filter conditioning logic 80 receives the relevant bits from the control register 32 as well as signals from the processor unit 4 indicative of its operating state, and asserts a signal to the OR gate 42 when any of the conditions are met which, in turn, sends a signal over the path 44 to the filter logic 15 to prevent the transmission of the contents stored in the shadow program counter register 12.

Privilege condition match logic 38 receives a privilege signal over the path 52 from the processor unit 4, in addition to bits 3 and 2 from the control register 32. The privilege signal provided over the path 52 indicates that the processor unit 4 is operating in a privileged mode when asserted and in a user mode when not asserted. When the privilege signal is asserted, the multiplexer 100 outputs the value provided on its '1' input from bit 2 of the control register 32 to the OR gate 42. If the value stored in bit 2 of the control register 32 is a logical '1' (indicating that transmission is to be prevented when the processor unit 4 is operating a privileged mode) then a logical '1' is provided over the path 53 to the OR gate 42. When the privilege signal is not asserted, the multiplexer 100 outputs the value provided on its '0' input from bit 3 of the control register 32 to the OR gate 42. If the value stored in bit 3 of the control register 32 is a logical '1' (indicating that transmission is to be prevented when the processor unit 4 is operating a user mode) then a logical '1' is provided over the path 53 to the OR gate 42. Hence, it can be seen that if the signal received over the path 52 matches the condition set by bits 3 and 2 in the control register 32, then a signal is provided over the path 53 to the OR gate 42.

Secure condition match logic 36 receives a secure signal over the path 50 from the processor unit 4, in addition to bits 1 and 0 from the control register 32. The secure signal provided over the path 50 indicates that the processor unit 4 is operating in the secure state when the signal is asserted and in a non-secure state when the signal is de-asserted. When the secure signal is asserted, a multiplexer (not shown, but which is similar to multiplexer 100) outputs the value provided on its '1' input from bit 1 of the control register 32 to the OR gate 42. If the value stored in bit 0 of the control register 32 is a logical '1' (indicating that transmission is to be prevented when the processor unit 4 is operating a secure state) then a logical '1' is provided over the path 57 to the OR gate 42. When the secure signal is not asserted, the multiplexer outputs the value provided on its '0' input from bit 1 of the control register 32 to the OR gate 42. If the value stored in bit 1 of the control register 32 is a logical '1' (indicating that transmission is to be prevented when the processor unit 4 is operating either in a non-secure state) then a logical '1' is provided over the path 57 to the OR gate 42. Hence, it can be seen that if the signal received over the path 50 matches the condition set by bits 1 and 0 in the control register 32, then a signal is provided over the path 57 to the OR gate 42.

Instruction set condition match logic 40 receives an instruction set signal over the 2-bit bus 54, in addition to bits 7 to 4 from the control register 32. The instruction set signal provided over the path 54 indicates the instruction set associated with the instruction currently being executed by the processor unit 4. When the instruction set signal is set at '00', indicating that the processor unit 4 is executing instructions from the ARM instruction set, then the instruction set condition match logic 40 outputs the value provided on its '00' input from bit 4 of the control register 32 to the OR gate 42. If the value stored in bit 4 of the control register 32 is a logical '1' (indicating that transmission is to be prevented when the processor unit 4 is executing instructions from the ARM instruction set) then a logical '1' is provided over the path 55 to the OR gate 42. When the instruction set signal is set at '01', indicating that the processor unit 4 is executing instructions from the Thumb instruction set, then the instruction set condition match logic 40 outputs the value provided on its '01' input from bit 5 of the control register 32 to the OR gate 42. If the value stored in bit 5 of the control register 32 is a logical '1' (indicating that transmission is to be prevented when the processor unit 4 is executing instructions from the Thumb instruction set) then a logical '1' is provided over the path 55 to the OR gate 42. When the instruction set signal is set at '10', indicating that the processor unit 4 is executing instructions from the Java instruction set, then the instruction set condition match logic 40 outputs the value provided on its '10' input from bit 6 of the control register 32 to the OR gate 42. If the value stored in bit 6 of the control register 32 is a logical '1' (indicating that transmission is to be prevented when the processor unit 4 is executing instructions from the Java instruction set) then a logical '1' is provided over the path 55 to the OR gate 42. Hence, it can be seen that if the signal received over the 2-bit bus 54 match the condition set by bits 7 to 4 in the control register 32, then a signal is asserted on the path 55 to the OR gate 42.

Process ID condition match logic 34 receives a value set at a logical '0' over path 108 at its default input and a process ID match signal over path 102 from the process ID comparator logic 31 at its "0001" inverting input, in addition to bits 11 to 8 from the control register 32.

When the bits 11 to 8 are set to "0001", the process ID condition match logic 34 outputs the value provided on its "0001" input in inverted form over the path 104 to the OR gate 42. As mentioned above, the process ID comparison result signal provided over path 102 is asserted when the process ID stored in the process ID register 30 matches the process ID signal provided by the processor unit 4 over the path 56. Also, the process ID comparison result signal provided over path 102 is not asserted when the process ID stored in the process ID register 30 does not match the process ID signal provided by the processor unit 4 over the path 56. If the process ID comparison result signal is not asserted, then a logical '1' (indicating that transmission is to be prevented because the process ID of the instruction to be executed by the processor unit 4 provided over the path 56 does not match that stored in the process ID register 30) is output by the process ID condition match logic 34 to the OR gate 42. If the process ID comparison result signal is asserted, then a logical. '0' (indicating that transmission is not to be prevented because the process ID of the instruction to be executed by the processor unit 4 provided over the path 56 matches that stored in the process ID register 30) is output by the process ID condition match logic 34 to the OR gate 42.

When the bits 11 to 8 are set to any other value then the process ID condition match logic 34 outputs the value provided on its default input over the path 104 to the OR gate 42. Accordingly, a logical '0' (indicating that transmission is not to be prevented) is output by the process ID condition match logic 34 to the OR gate 42.

The signal SNIDEN is received over the path 64 at an inverting input of an AND gate 60. The other inputs of the AND gate 60 receive the secure signal over the path 50 and the privileged signal over the path 52. Hence, when the secure signal and the privileged signal are both asserted, and the signal SNIDEN is not asserted then a signal is asserted on the path 59 to the OR gate 42 which, in turn, sends a signal over the path 44 to the filter logic 15 to prevent the transmission of the contents stored in the shadow program counter register 12. However, if the signal SNIDEN is asserted then no signal is asserted on the path 59 to the OR gate 42 regardless of the value of the secure or privileged signals, which enables the contents stored in the shadow program counter register 12 to be transmitted.

The signal SUNIDEN is received over the path 66 at an inverting input of an AND gate 62. The other inputs of the AND gate 60 receive the secure signal over the path 50 at an non-inverting input, the privileged signal over the path 52 at an inverting input, and the SNIDEN signal over the path 64 at an inverting input. Hence, when the secure signal is asserted, the privileged signal is not asserted, the SNIDEN signal is not asserted and the SUNIDEN signal is not asserted, then a signal is asserted on the path 68 to the OR gate 42 which, in turn, sends a signal over the path 44 to the filter logic 15 to prevent the transmission of the contents stored in the shadow program counter register 12. However, if the signal SNIDEN is asserted or the signal SUNIDEN is asserted then no signal is asserted on the path 59 to the OR gate 42 regardless of the value of the secure or privileged signals, which enables the contents stored in the shadow program counter register 12 to be transmitted.

Accordingly, it will be appreciated that the combination of the AND gates 60 and 62 in combination with the OR gate 42 implement the rule that when the signal SNIDEN is asserted, the contents stored in the shadow program counter register 12 can be transmitted when the processor unit 4 is in the secure state, and that when the signal SUNIDEN is asserted, the contents stored in the shadow program counter register 12 can be transmitted in the secure user state; otherwise if the processor unit 4 is in the secure state then the contents stored in the shadow program counter register 12 are not to be transmitted in the secure state. This rule is expressed by the truth table shown below as Table 1. Path 59 and path 68 are inputs to OR gate 42, and hence if either has the value '1' then the output of OR gate 42 on path 44 will be '1'.

TABLE 1

| secure | privileged | SNIDEN | SUNIDEN | Path 59 | Path 68 |
|--------|------------|--------|---------|---------|---------|
| 0 | x | x | x | 0 | 0 |
| x | x | 1 | x | 0 | 0 |
| 1 | 1 | 0 | x | 1 | 0 |
| 1 | 0 | 0 | 0 | 0 | 1 |
| 1 | 0 | x | 1 | 0 | 0 |

The signal SUNIDEN generated by the processor unit 4 is programmed by operating system software executed on the processor unit 4 to indicate that the address value stored in the shadow program counter register 12 is permitted to be transmitted to the diagnostic system 14 for code executed in a non-privileged mode in a secure state.

As illustrated in FIG. 2, in addition to the signals from the filter conditioning logic 80, the OR gate 42 is also responsive to two further signals, NIDEN and dbgack, from the data processing apparatus 2 indicative of its operating state, the occurrence of which may also prevent the propagation of the value stored in the shadow program counter register 12.

An inverted form of the signal NIDEN is received directly by the OR gate 42. The signal NIDEN is asserted to indicate non-invasive debug is permitted by the data processing apparatus 2. Hence, when the signal NIDEN is not asserted, the OR gate 42 sends a signal over the path 44 to the filter logic 15 to prevent the transmission of the contents stored in the shadow program counter register 12.

The signal dbgack is received directly by the OR gate 42. The signal dbgack is asserted to indicate that the data processing apparatus 2 is in a debug state. Hence, when the signal dbgack is asserted, the OR gate 42 sends a signal over the path 44 to the filter logic 15 to prevent the transmission of the contents stored in the shadow program counter register 12.

Accordingly, it can be seen that the diagnostic hardware 10 can be programmed to prevent the transmission of program counter values from the shadow program counter register 12 via the scan chain 16 to the diagnostic system 14. Some of these conditions are programmed into the control register 32. The filter conditioning logic 80 which receives an indication of those conditions are compares them against information provided by the processor unit 4. If any of the conditions are met then a signal is provided to the OR gate 42 which, in turn, provides a signal over the path 44 to the filter logic 15 to indicate that the value stored in the shadow program counter register 12 should be prevented. Other conditions are, in the embodiment illustrated, enforced by arrangement of the diagnostic hardware 10 and cannot be overridden by the diagnostic system 14. Accordingly, whilst the conditions are met the filter logic 15 will provide to the scan chain 16 a predetermined program counter value. In this manner, it will be appreciated that the transmission of the value stored in the shadow program counter register 12 can be prevented when one or more predetermined conditions are met. Hence, when the diagnostic system 14 wishes to request a program counter value, it issues a program counter request signal to the diagnostic hardware 10. This program counter request signal is scanned into the scan chain 16 and then transferred to the diagnostic hardware 10. The diagnostic hardware 10 interprets this program counter request signal and issues an appropriate control signal "next" to the synchronising unit 12 that, in turn, serves to trigger the transfer of the shadow program counter value to the filter logic 15. If any of the predetermined conditions are met then the filter logic 15 will provide a predetermined program counter value to the scan chain at the next appropriate point within the processing clock signal pclk. When this transfer has taken place, the program counter value is scanned out of the scan chain 16 and returned to the diagnostic system 14 for analysis, such as by code profiling. During subsequent analysis, the diagnostic system 14 can readily identify the predetermined program counter values as being those values which are irrelevant or which would be misleading.

Although illustrative embodiments of the invention have been described herein with reference to the accompanying drawings, it is to be understood that the invention is not limited to those precise embodiments, and that various changes and modifications can be affected therein by one scope in the art without departing from the scope and spirit of the invention as defined by the appended claims.

I claim:

1. A data processing apparatus comprising:
a processor unit configured to execute data processing instructions;
a processor state register within said processor unit configured to store processor state information associated with a data processing instruction being executed by said processor unit;
transmission circuitry comprising a scan chain for transmitting information from said data processing apparatus to a diagnostic system; and
a processor state storage circuit configured to store said processor state information provided by said processor state register for transmission to a diagnostic system through said transmission circuitry,
said processor state storage circuit being further configured, in response to a processor state request signal from said diagnostic system requesting said stored processor state information, to propagate a predetermined value to said scan chain instead of said stored processor state information when said processor unit is in a predetermined operating state,
wherein said predetermined value is indicative to said diagnostic system that propagation of said stored processor state information to said scan chain has been prevented.

2. The data processing apparatus of claim 1, wherein said processor state information comprises an instruction address of said data processing instruction being executed by said processor unit.

3. The data processing apparatus of claim 2, wherein said predetermined value is a reserved or invalid address.

4. The data processing apparatus of claim 2, wherein said diagnostic system is configured to analyze instruction addresses associated with data processing instructions of software under test.

5. The data processing apparatus of claim 4, wherein said predetermined operating state comprises a state where execution of said data processing instructions of said software under test is suspended.

6. The data processing apparatus of claim 5, wherein said predetermined operating state comprises a debug state.

7. The data processing apparatus of claim 4, wherein said predetermined operating state comprises a state where said processor unit is executing a data processing instruction other than data processing instructions of said software under test.

8. The data processing apparatus of claim 4, wherein said processor unit is configured to execute data processing instructions relating to different processes, said software under test comprises one predetermined process of said different processes and said predetermined operating state comprises a state where said processor unit is executing a data processing instruction other than a data processing instruction of said predetermined process.

9. The data processing apparatus of claim 2, wherein said predetermined operating state comprises a state where said processor unit is executing data processing instructions from a predetermined instruction set.

10. The data processing apparatus of claim 9, wherein said predetermined instruction set comprises one or more of an ARM, Thumb and Java instruction set.

11. The data processing apparatus of claim 2, wherein said predetermined operating state comprises a state where said processor unit is executing data processing instructions in a predetermined mode.

12. The data processing apparatus of claim 11, wherein said predetermined mode comprises a state where said processor unit is executing a data processing instruction for which transmission of its instruction address is not permitted by said data processing apparatus.

13. The data processing apparatus of claim 11, wherein said predetermined mode comprises a state where said processor unit is executing a data processing instruction for which receipt of its instruction address is not required by said diagnostic system.

14. The data processing apparatus of claim 11, wherein said predetermined mode comprises a secure state.

15. The data processing apparatus of claim 11, wherein said processor unit is configured in a secure state to execute data processing instructions relating to different processes and said predetermined mode comprises a secure process mode in which said processor unit is executing a data processing instruction other than a data processing instruction of one or more predetermined processes executing in said secure mode.

16. The data processing apparatus of claim 15, wherein said different processes execute in either a privileged or a non-privileged mode and said secure process mode comprises a secure non-privileged process mode in which said processor unit is executing a data processing instruction other than a data processing instruction of a predetermined process executing in said non-privileged mode.

17. The data processing apparatus of claim 11, wherein said predetermined mode comprises a privileged mode.

18. The data processing apparatus of claim 11, wherein said processor unit is configured in a privileged mode or a non-privileged mode to execute data processing instructions relating to different processes and said predetermined mode comprises a non-privileged process mode in which said processor unit is executing a data processing instruction other than a data processing instruction of a predetermined process executing in said non-privileged mode.

19. The data processing apparatus of claim 1, wherein said diagnostic system is configured to control said processor state storage circuit in order to set one or more predetermined operating states which prevent transmission of said stored processor state information to said diagnostic system.

20. The data processing apparatus of claim 19, wherein said processor state storage circuit further comprises a number of registers configured to store information provided by said diagnostic system indicative of said one or more predetermined operating states which prevent transmission of said stored processor state information to said diagnostic system.

21. The data processing apparatus of claim 20, wherein said processor state storage circuit is configured to determine whether said processor unit is in said one or more predetermined operating states by comparing information provided by said processor unit indicative of its operating state with said information stored in said number of registers.

22. In a data processing apparatus comprising: a processor unit configured to execute data processing instructions; a processor state register within said processor unit configured to store processor state information associated with a data processing instruction being executed by said processor unit; transmission circuitry comprising a scan chain for transmitting information from said data processing apparatus to a diagnostic system; and a processor state storage circuit configured to store said processor state information provided by said processor state register for transmission to a diagnostic system through said transmission circuitry, a method of processing data comprising the steps of:
  a) providing, from said diagnostic system, a processor state request signal requesting said stored processor state information; and
  b) propagating a predetermined value to said scan chain instead of said stored processor state information, said predetermined value being indicative to said diagnostic system that propagation of said stored processor state information to said scan chain has been prevented.

23. The method of claim 22, wherein
said processor state information comprises an instruction address of said data processing instruction being executed by said processor unit.

24. The method of claim 23, wherein said predetermined value is a reserved or invalid address.

25. The method of claim 23, wherein said diagnostic system is configured to analyze instruction addresses associated with data processing instructions of software under test.

26. The method of claim 25, wherein said predetermined operating state comprises a state where execution of said data processing instructions of said software under test is suspended.

27. The method of claim 26, wherein said predetermined operating state comprises a debug state.

28. The method of claim 25, wherein said predetermined operating state comprises a state where said processor unit is executing a data processing instruction other than data processing instructions of said software under test.

29. The method of claim 25, wherein said processor unit is configured to execute data processing instructions relating to different processes, said software under test comprises one predetermined process of said different processes and said predetermined operating state comprises a state where said processor unit is executing a data processing instruction other than a data processing instruction of said predetermined process.

30. The method of claim 23, wherein said predetermined operating state comprises a state where said processor unit is executing data processing instructions from a predetermined instruction set.

31. The method of claim 30, wherein said predetermined instruction set comprises one or more of an ARM, Thumb and Java instruction set.

32. The method of claim 23, wherein said predetermined operating state comprises a state where said processor unit is executing data processing instructions in a predetermined mode.

33. The method of claim 32, wherein said predetermined mode comprises a state where said processor unit is executing a data processing instruction for which transmission of its instruction address is not permitted by said data processing apparatus.

34. The method of claim 30, wherein said predetermined mode comprises a state where said processor unit is executing a data processing instruction for which receipt of its instruction address is not required by said diagnostic system.

35. The method of claim 32, wherein said predetermined mode comprises a secure state.

36. The method of claim 32, wherein said processor unit is configured in a secure state to execute data processing instructions relating to different processes and said predetermined mode comprises a secure process mode in which said processor unit is executing a data processing instruction other than a data processing instruction of one or more predetermined processes executing in said secure mode.

37. The method of claim 36, wherein said different processes execute in either a privileged or a non-privileged mode and said secure process mode comprises a secure non-privileged process mode in which said processor unit is executing a data processing instruction other than a data processing instruction of a predetermined process executing in said non-privileged mode.

38. The method of claim 32, wherein said predetermined mode comprises a privileged mode.

39. The method of claim 32, wherein said processor unit is configured in a privileged mode or a non-privileged mode to execute data processing instructions relating to different processes and said predetermined mode comprises a non-privileged process mode in which said processor unit is executing a data processing instruction other than a data processing instruction of a predetermined process executing in said non-privileged mode.

40. The method of claim 22, further comprising the step of:
controlling said processor state storage circuit, using said diagnostic system, in order to set one or more predetermined operating states which prevent transmission of said stored processor state information to said diagnostic system.

41. The method of claim 40, wherein said processor state storage circuit further comprises a number of registers configured to store information provided by said diagnostic system indicative of said one or more predetermined operating states which prevent transmission of said stored processor state information to said diagnostic system.

42. The method of claim 41, wherein said step (b) further comprises the step of:
determining whether said processor unit is in said one or more predetermined operating states by comparing information provided by said processor unit indicative of its operating state with said information stored in said number of registers.

* * * * *